United States Patent [19]
Anderson et al.

[11] Patent Number: 5,100,313
[45] Date of Patent: Mar. 31, 1992

[54] COHERENT JET COMBUSTION

[75] Inventors: John E. Anderson, Somers; William J. Snyder, Ossining, both of N.Y.

[73] Assignee: Union Carbide Industrial Gases Technology Corporation, Danbury, Conn.

[21] Appl. No.: 650,852

[22] Filed: Feb. 5, 1991

[51] Int. Cl.$^5$ .................................................. F23R 3/2
[52] U.S. Cl. ........................................ 431/8; 431/159; 431/181; 431/187
[58] Field of Search ................... 431/187, 181, 159, 8, 431/10; 239/8, 132.5, 429, 432, 434.5

[56] References Cited

U.S. PATENT DOCUMENTS

| | | | |
|---|---|---|---|
| 3,174,527 | 3/1965 | Reed et al. | 431/187 |
| 4,378,205 | 3/1983 | Anderson | 431/5 |
| 4,439,137 | 3/1984 | Suzuki et al. | 431/8 |
| 4,541,796 | 9/1985 | Anderson | 431/187 |
| 4,541,798 | 9/1985 | Miller et al. | 431/266 |
| 4,693,680 | 9/1987 | Snyder et al. | 431/10 |
| 4,878,829 | 11/1989 | Anderson | 431/8 |
| 4,892,475 | 1/1990 | Farrenkopf et al. | 431/8 |
| 4,907,961 | 3/1990 | Anderson | 431/8 |

FOREIGN PATENT DOCUMENTS 0155102 12/1980 Japan .................... 431/187

Primary Examiner—Carl D. Price
Assistant Examiner—L. Heyman
Attorney, Agent, or Firm—Stanley Ktorides

[57] ABSTRACT

Combustion method and apparatus establishing coherent jet oxidant flow within a cavity recessed from the main combustion area enabling operation without need for water cooling.

23 Claims, 2 Drawing Sheets

COHERENT JET COMBUSTION

TECHNICAL FIELD

The invention relates generally to the field of burners and combustion and is particularly advantageous for use with burners and combustion employing oxygen or oxygen-enriched air as the oxidant.

BACKGROUND ART

In the operation of a burner to carry out combustion, especially in an industrial setting, a major problem is heat damage to the burner.

One conventional method for reducing heat damage to a burner is to circulate a coolant such as water through the burner. While this method provides adequate cooling to the burner, it has several disadvantages. A supply of clean water is required at the requisite pressure and such a supply may not always be readily available without considerable effort and additional equipment. The burner design itself is considerably more complicated to accommodate the coolant passages. The cooled burner surface temperature may be low enough to cause condensation of furnace gases which may corrode the burner. Coolant leaks may develop within the burner which can cause damage to the burner or a shutdown of the combustion operation.

For all of these reasons it is desirable to have a burner and combustion method which can operate without the need for employing circulating coolant.

One method for addressing this problem which has found use in industrial combustion operations comprises recessing the burner from the furnace or combustion zone. Generally such a burner is recessed within a cavity in the furnace wall. In this way less heat or energy from the combustion zone is radiated to the burner surface and thus a separate coolant is not needed. Heat transfer by radiation from the furnace decreases as the burner is withdrawn into the cavity. However, with a burner recessed within a cavity, combustion may, and usually does, occur within the cavity thus generating heat close to the burner surface and thereby increasing the heat to the burner.

With air as the oxidant there is a large volume of oxidant flow which can be used to cool the burner and refractory walls. Moreover, the flame temperature for combustion with air is lower than that for combustion with oxygen or oxygen-enriched air so that combustion within the cavity usually does not have serious consequences. However the problem of heat damage to a recessed burner by combustion within a cavity becomes more acute as the oxygen concentration of the oxidant is increased to concentrations significantly greater than that of air. Accordingly, in such situations a burner is recessed only a small distance from the combustion zone thus reducing the protective effect of the recession, and/or the flowrates of fuel and oxidant are very carefully controlled to diminish combustion proximate the burner which serves to complicate the combustion operation and to reduce its efficiency.

Accordingly it is an object of this invention to provide a combustion method which can operate efficiently without the need for water cooling.

It is a further object of this invention to provide a burner which can operate without damage caused by heat and without the need for water cooling It is yet another object of this invention to provide a combustion method employing oxygen or oxygen-enriched air as the oxidant which can be carried out without the need for water cooling.

It is a still further object of this invention to provide a burner which can use oxygen or oxygen-enriched air as the oxidant while not requiring water cooling.

SUMMARY OF THE INVENTION

The above and other objects which will become apparent to one skilled in the art upon a reading of this disclosure are attained by the present invention one aspect of which is:

A method for carrying out combustion comprising:

(A) providing a walled cavity communicating with a combustion zone;

(B) providing fuel into the cavity and flowing the fuel through the cavity near the cavity wall;

(C) providing main oxidant into the cavity and flowing the main oxidant at a high velocity through the cavity;

(D) providing secondary oxidant into the cavity and flowing the secondary oxidant, at a velocity less than that of the main oxidant, through the cavity between the flowing fuel and the flowing main oxidant to maintain the flow of main oxidant substantially coherent as it flows through the cavity; and (E) passing fuel and oxidant into the combustion zone for combustion therein.

Another aspect of the invention comprises:

Non-water-cooled combustion apparatus comprising:

(A) a walled cavity having an output end;

(B) means for providing fuel into the walled cavity recessed from the output end;

(C) means for providing main oxidant into the cavity recessed from the output end; and (D) means for providing secondary oxidant into the cavity recessed from the output end between the fuel and the main oxidant, said cavity having a length sufficient to maintain the main oxidant and fuel substantially unmixed within the cavity by the interpositioned secondary oxidant.

As used herein the term "water cooling" means the use of water or a water-containing liquid to cool a burner.

As used herein the term "coherent" means the flow of gas with little or no entrainment of ambient gas into the flowing gas.

As used herein the term "jet" means a stream of gas leaving a hole in a nozzle at a substantially high velocity. In a conventional jet there is entrained into the jet a substantial amount of ambient gas due to turbulence at the jet-ambient gas interface causing the jet to expand as it flows from the nozzle. In a coherent jet only a minimal amount of ambient gas is entrained into the jet and the jet expands very little as it flows from the nozzle face.

DETAILED DESCRIPTION

The invention comprises, in general, the establishment and use of one or more high velocity coherent oxidant jets within a cavity recessed from a combustion zone which serve to retard combustion within the cavity but which serve to promote stable combustion upon passage from the cavity output end into the combustion zone.

Figure 1:
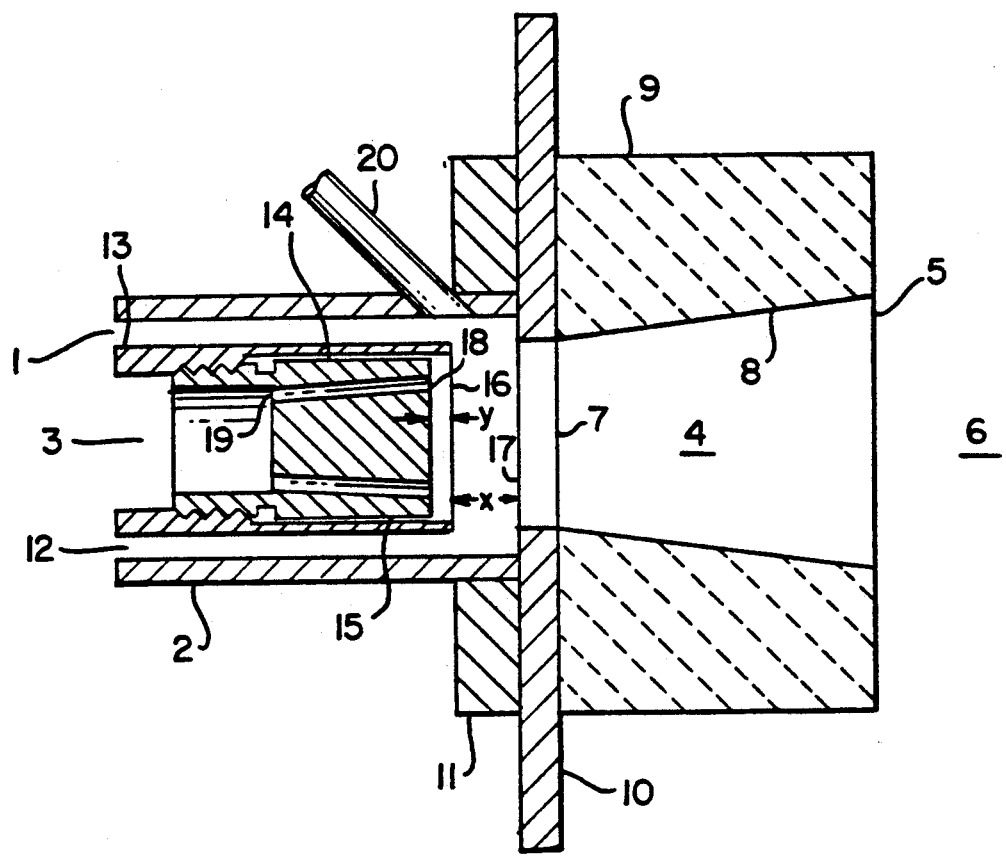
FIG. 1 is a cross-sectional representation of one preferred embodiment of the invention.

The invention will be described in detail with reference to the Drawings. Referring now to FIG. 1 which illustrates one preferred embodiment of the invention, burner 1 comprises fuel tube 2 and oxidant provision means 3 which provide fuel and oxidant into walled cavity 4 which communicates at output end 5 with combustion zone 6. The fuel and oxidant may be provided into cavity 4 at its input end 7 as illustrated in FIG. 1 or at any point within the walled cavity recessed from its output end. The walled cavity may have any desired configuration. For example the walled cavity 20 may have outwardly tapered walls 8 so that it is conical as illustrated in FIG. 1 or may have straight walls so that it is cylindrical. The walled cavity is situated within refractory 9 which is generally part of a furnace wall. The burner 1 is secured to the refractory wall cavity by means of block plate 10 and flange 11.

Fuel is provided into cavity 4 through outer annular passageway 12 and flows through cavity 4 near cavity wall 8 and then through output end 5 into combustion zone 6. The fuel is a gaseous fuel such as natural gas, methane, propane, or coke oven gas.

Oxidant is provided into cavity 4 through oxidant provision means 3. In the embodiment illustrated in FIG. 1 the oxidant provision means comprises outer tube 13 containing screwable removable nozzle 14 which is slightly smaller than outer tube 13 so as to define an annular passageway 15. Preferably, as illustrated in FIG. 1, the end 16 of oxidant provision means 3 is recessed from the inlet end 17 of the cavity such as by the distance x illustrated in FIG. 1. The distance x will vary depending upon the absolute size of the burner apparatus. The injection end of the burner may be upstream of or within the walled cavity. In addition the end 18 of nozzle 14 is preferably recessed from end 16 by a distance y which may be within the range of from 0.125 to 0.5 inch.

Figure 4:
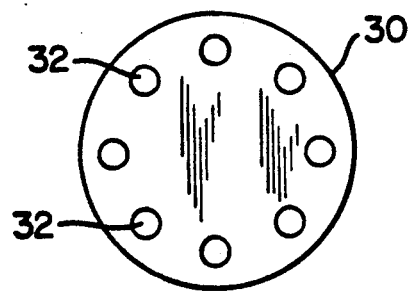
FIG. 4 is a head-on view of the nozzle illustrated in FIG. 3.
Figure 3:
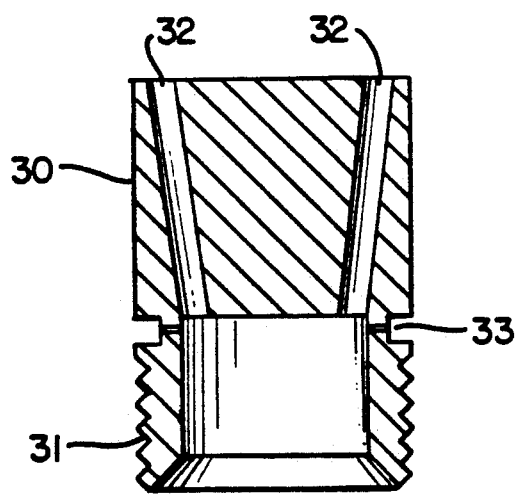
FIG. 3 is a cross-sectional representation of one embodiment of a main oxidant nozzle useful with the invention.

Nozzle 14 may have any effective configuration. One such configuration is shown in FIGS. 3 and 4. Referring now to FIGS. 3 and 4, nozzle 30 comprises threads 31 with which it may be inserted into the outer tube. Nozzle 30 also comprises a plurality of individual jet passages 32 through which oxidant is provided at a high velocity into the walled cavity. The nozzle illustrated in FIGS. 3 and 4 has eight such jet passages 32. FIG. 4 illustrates a preferred arrangement wherein the jet passages are in a circular arrangement. Nozzle 30 also has annulus oxidant feed means 33 through which oxidant flows into the annular passageway.

The oxidant may be any effective oxidant. The advantages attainable with this invention are most noticeable when the oxidant has an oxygen concentration of 30 percent or more. A particularly preferred oxidant is technically pure oxygen having an oxygen concentration of 99.5 percent or more.

Main oxidant is provided into the walled cavity and flows therethrough at a high velocity. Generally the velocity of the main oxidant is greater than 5P where P is the volume percent of oxygen in the main oxidant and the velocity is in feet per second (fps). Preferably the main oxidant velocity is at least 500 fps. Referring back to FIG. 1, the main oxidant is provided into walled cavity 4 as one or more high velocity jets through jet passages 19. Preferably the main oxidant is provided into and flows through the walled cavity as a plurality of jets. The jets will number generally within the range of from 1 to 16, preferably within the range of from 1 to 8.

Secondary oxidant is provided into the walled cavity and flows therethrough at a velocity which is less than that of the main oxidant. Generally the velocity of the secondary oxidant is less than one half of the velocity of the main oxidant and preferably is less than 100 fps. The secondary oxidant will generally comprise from about 1 to 10 percent of the total oxidant provided into the walled cavity.

Ignition of the combustible mixture may be attained by any convenient means. In the embodiment illustrated in FIG. 1 there is shown 20 the use of the igniter disclosed in U.S. Pat. No. 4,892,475 Farrenkopf et al. as the means for igniting the combustion reaction.

In operation, the high velocity main oxidant passes through the walled cavity as one or more high velocity jets while the lower velocity secondary oxidant flows through the walled cavity between the high velocity main oxidant and the fuel thus serving to maintain the flow of main oxidant substantially coherent as it flows through the walled cavity.

In a particularly preferred embodiment the secondary oxidant due to its lower velocity mixes with and combusts with fuel within the cavity and this combustion forms a thin envelope around the high velocity oxidant. It is believed that if a combustion reaction is occurring at the main oxidant jet boundary, then the temperature will increase with a corresponding increase in gas volume. The gas at the interface will expand resulting in a velocity component in the radial direction. As the gas moves out radially, the turbulent boundary layer that is initiated at the high velocity - low velocity interface is continuously removed along the length of the jet in the same way as may happen with the use of suction for gas flow over a flat plate wherein the suction continuously removes the turbulent boundary layer and prevents it from growing. If the turbulent boundary layer is continuously removed for the length of the jet, entrainment will be minimized and the jet will be coherent.

Figure 2:
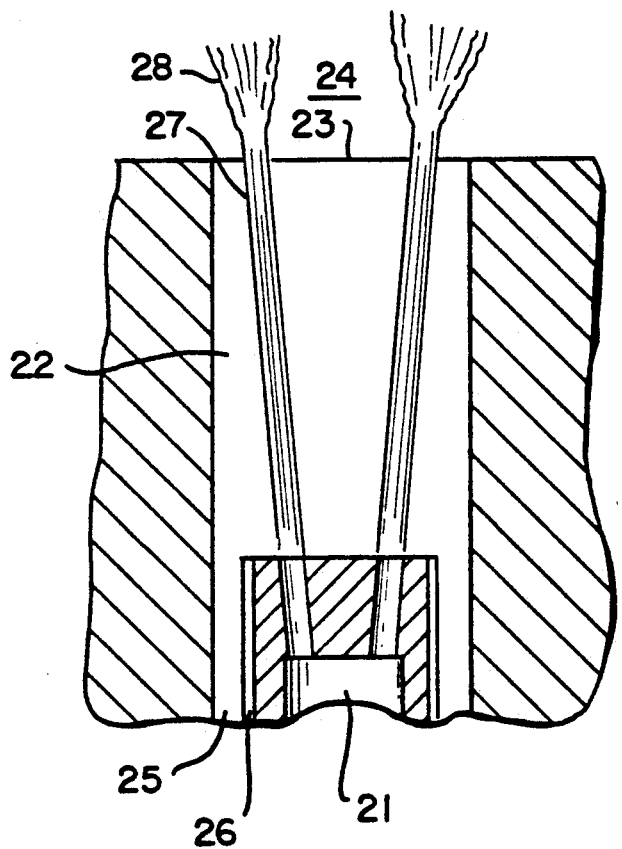
FIG. 2 is a simplified cross-sectional representation of the invention in operation.

FIG. 2 illustrates in simplified form the operation of the invention to achieve coherent jet flow through the walled cavity. Referring now to FIG. 2, burner 21 is placed within walled cavity 22 and is recessed from the output end 23 of cavity 22 which communicates with combustion zone 24. Fuel is provided into cavity 22 through passage 25 and lower velocity secondary oxidant is provided into cavity 22 through annular passage 26. There is established within cavity 22 one or more coherent jets 27 of high velocity oxidant which pass through cavity 22 with minimal combustion of the high velocity main oxidant with the fuel. The combustion of the lower velocity secondary oxidant with the fuel results in a buffer layer of combustion products around the main oxidant. Upon passage into the combustion zone through the output end 23 of cavity 22 the consequent turbulence 28 causes the coherent jet or jets to break up resulting in rapid entrainment or mixing of the fuel with the oxidant resulting in effective stable combustion.

As a consequence of the fact that most of the combustion occurs in the combustion zone well away from the burner which is recessed within the walled cavity, very little of the heat released by the combustion is radiated to the burner. Thus the burner need not be water cooled to avoid damage from heat.

It is preferred that the burner be as deeply recessed from the output end of the walled cavity as possible because the deeper the recession the greater is the protection of the burner from heat damage. However if the burner is recessed too deeply, the coherency of the high velocity main oxidant jet(s) may break down prior to their flow through the output end into the combustion zone resulting in significant combustion within the walled cavity with corresponding overheating. This defeats the purpose of the invention. The maximum length that the burner may be recessed will vary with each case depending on the absolute size of the burner apparatus.

As mentioned, the embodiment of the invention illustrated in FIG. 1 wherein the cavity has a conical shape and the burner is upstream of the cavity is a preferred embodiment. Applicants have found that with such an embodiment the most advantageous results are attained where $A > 0.5\ F$ and $L < 4$ (square root of F) where: $A$ = area of the smaller cone opening at the burner end in square inches, $F$ = firing rate of the burner in MMBtu/hr and $L$ = refractory cone length in inches.

In addition it is preferred that the cone half angle be less than 15 degrees.

The following Example is provided for illustrative purposes and is not intended to be limiting.

A burner of this invention was operated within a cylindrical cavity recessed from the cavity output end. The recess was varied from 1 to 8 inches. The oxidant employed was technically pure oxygen and the fuel was natural gas. The main oxidant velocity was greater than sonic velocity which is about 1000 fps and the secondary oxidant velocity was about 80 fps. The main oxidant comprised 8 high velocity jets. The burner was fired at a firing rate of 10 MM Btu/hr. A thermocouple was set in a stainless steel nozzle ⅛ inch back from the burner face. The burner was recessed in a cavity 4.5 inches in diameter. As the recess length was increased form 1 to 6 to 8 inches, the measured nozzle temperatures were 425°, 398° F. and 412° F. respectively. The oxygen jets were coherent within the cavity. These tests demonstrated that the burner apparatus and combustion method can be employed without the need for water cooling while avoiding overheating.

Although the invention has been described in detail with reference to certain embodiments, those skilled in the art will recognize that there are other embodiments of the invention within the spirit and the scope of the claims.

We claim:

1. A method for carrying out combustion comprising:
   (A) providing a walled cavity communicating with a combustion zone;
   (B) providing fuel into the cavity and flowing the fuel therebetween completely through the cavity near the cavity wall;
   (C) providing main oxidant into the cavity and flowing the main oxidant at a high velocity through the cavity;
   (D) providing secondary oxidant into the cavity and flowing the secondary oxidant, at a velocity less than that of the main oxidant, through the cavity between the flowing fuel and the flowing main oxidant to maintain the flow of main oxidant coherent as it flows through the cavity; and
   (E) main oxidant from the cavity into the combustion zone wherein the flow of main oxidant is not coherent and mixes with and combusts with the fuel.

2. The method of claim 1 wherein at least one of the main oxidant and the secondary oxidant has an oxygen concentration of 30 percent or more.

3. The method of claim 1 wherein at least one of the main oxidant and the secondary oxidant comprises technically pure oxygen.

4. The method of claim 1 wherein the velocity of the main oxidant is greater than 500 feet per second.

5. The method of claim 1 wherein the velocity of the secondary oxidant is less than one half of that of the main oxidant.

6. The method of claim 1 wherein the secondary oxidant comprises from 1 to 10 percent of the total oxidant provided into the walled cavity.

7. The method of claim 1 wherein the secondary oxidant is provided into the walled cavity as an annular stream around the main oxidant.

8. The method of claim 1 wherein the main oxidant is provided into the walled cavity in a plurality of jets.

9. The method of claim 8 wherein the number of main oxidant jets is up to 16.

10. The method of claim 1 wherein the secondary oxidant combusts with fuel within the cavity and forms an envelope comprising combustion products around the main oxidant within the cavity.

11. Non-water-cooled combustion apparatus comprising:
   (A) a walled cavity having an output end;
   (B) means for providing fuel into the walled cavity recessed from the output end for flow therefrom near the cavity wall completely through the cavity;
   (C) means for providing main oxidant into the cavity recessed from the output end; and
   (D) means for providing secondary oxidant into the cavity recessed from the output end between the fuel and the main oxidant, said cavity having a length sufficient to maintain the main oxidant and the fuel unmixed throughout the extent of the cavity by the interpositioned secondary oxidant and whereby said main oxidant is maintained within said cavity as a coherent flow.

12. The apparatus of claim 11 wherein the cavity has a conical shape.

13. The apparatus of claim 11 wherein the cavity has a cylindrical shape.

14. The apparatus of claim 11 wherein the means for providing fuel, main oxidant and secondary oxidant into the walled cavity are all incorporated within a single burner device.

15. The apparatus of claim 14 wherein the burner has an injection end upstream of the walled cavity.

16. The apparatus of claim 14 wherein the burner has an injection end within the walled cavity.

17. The apparatus of claim 11 wherein the means for providing secondary oxidant comprises an annulus around the means for providing main oxidant.

18. The apparatus of claim 11 wherein the means for providing main oxidant comprises a nozzle having a plurality of jet passages.

19. The apparatus of claim 18 wherein the number of jet passages is up to 16.

20. The apparatus of claim 18 wherein the jet passages are in a circular arrangement.

21. The apparatus of claim 12 wherein the means for providing fuel, main oxidant and secondary oxidant into the walled cavity are all incorporated within a single burner device.

22. The apparatus of claim 21 wherein $A > 0.5 F$ and $L < 4$ (square root of F) where A=area of the smaller cone opening at the burner end in square inches, F=firing rate of the burner in million BTU/hr and L=refractory cone length in inches.

23. The apparatus of claim 12 wherein the cone half angle is less than 15 degrees.

* * * * *

UNITED STATES PATENT AND TRADEMARK OFFICE
CERTIFICATE OF CORRECTION

PATENT NO. : 5,100,313
DATED : March 31, 1992
INVENTOR(S) : J. E. Anderson, et al.

It is certified that error appears in the above-identified patent and that said Letters Patent is hereby corrected as shown below:

Col. 5, line 61:
In claim 1, line 5 delete "therebetween" and insert therefor -- therefrom --.

Col. 6, line 4:
In claim 1, line 16 between "(E)" and "from" delete "main oxidant" and insert therefor -- passing said fuel and said main and secondary oxidants --.

Signed and Sealed this

Twenty-fifth Day of January, 1994

Attest:

BRUCE LEHMAN

Attesting Officer   Commissioner of Patents and Trademarks